(12) United States Patent
Fleming et al.

(10) Patent No.: US 11,651,059 B2
(45) Date of Patent: May 16, 2023

(54) USER ACCOUNT MATCHING BASED ON A NATURAL LANGUAGE UTTERANCE

(71) Applicant: Amazon Technologies, Inc., Seattle, WA (US)

(72) Inventors: Michael Reid Fleming, Seattle, WA (US); Somayeh M Elleuch, Seattle, WA (US); Kumar J Brahnmath, Bellevue, WA (US); Deepthi Chidambaram, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 414 days.

(21) Appl. No.: 16/748,628

(22) Filed: Jan. 21, 2020

(65) Prior Publication Data
US 2021/0224367 A1    Jul. 22, 2021

(51) Int. Cl.
| | | |
|---|---|---|
| *G10L 15/22* | (2006.01) | |
| *G06F 21/32* | (2013.01) | |
| *G10L 15/18* | (2013.01) | |
| *G10L 17/12* | (2013.01) | |
| *G10L 17/24* | (2013.01) | |
| *G10L 15/08* | (2006.01) | |

(52) U.S. Cl.
CPC .......... *G06F 21/32* (2013.01); *G10L 15/1815* (2013.01); *G10L 15/22* (2013.01); *G10L 17/12* (2013.01); *G10L 17/24* (2013.01); *G10L 2015/088* (2013.01); *G10L 2015/227* (2013.01)

(58) Field of Classification Search
CPC ......... G10L 15/22; G10L 15/00; G10L 15/04; G10L 15/06; G10L 15/07; G10L 15/08; G10L 15/18; G10L 15/19; G10L 15/26; G10L 2015/0631–0638; G10L 2015/221–228
USPC .... 704/270.1, 275, 270, 273, 231, 244, 245, 704/246, 251, 255
See application file for complete search history.

(56) References Cited

U.S. PATENT DOCUMENTS

| | | | |
|---|---|---|---|
| 2013/0097682 A1* | 4/2013 | Zeljkovic | H04L 9/3231 726/7 |
| 2019/0156830 A1 | 5/2019 | Devaraj et al. | |
| 2019/0244196 A1* | 8/2019 | John | G10L 15/26 |
| 2019/0378500 A1 | 12/2019 | Miller et al. | |

(Continued)

OTHER PUBLICATIONS

WO Application No. PCT/US2021/012896, International Search Report and Written Opinion, dated Apr. 21, 2021, 12 pages.

*Primary Examiner* — Qi Han
(74) *Attorney, Agent, or Firm* — Kilpatrick Townsend & Stockton LLP

(57) ABSTRACT

Techniques are described for user account matching based on natural language utterances. In an example, a computer system receives a set of words, a voice print, and offer data about an offer based at least in part on a natural language utterance at a user device. The computer system determines a set of user accounts based at least in part on the set of words and determines, from this set, a first user account based at least in part on the voice print. The first user account is associated with a first user identifier. The computer system determines that the offer is associated with a second user account that is further associated with a second user identifier. The computer system generates associations of the user accounts with user identifiers and with the offer.

20 Claims, 9 Drawing Sheets

(56) References Cited

U.S. PATENT DOCUMENTS

2020/0043066 A1\* 2/2020 Obaidi ................ H04L 63/0861
2020/0168229 A1\* 5/2020 Manchireddy ... G06Q 20/40145

\* cited by examiner

USER ACCOUNT MATCHING BASED ON A NATURAL LANGUAGE UTTERANCE

BACKGROUND

As voice recognition technology improves, systems that employ such technology continue to proliferate. Some systems employ what is referred to as near-field voice recognition where a user speaks into a microphone located on a hand-held device, such as a remote control or mobile device. Other systems employ far-field voice recognition where a user can speak to a device while the user is within the general vicinity of the device, e.g., within the same room, but not necessarily in close proximity to or even facing the device. Both far-field devices and near-field devices can be deployed to provide user interfaces to various computing services.

BRIEF DESCRIPTION OF THE DRAWINGS

Various embodiments in accordance with the present disclosure will be described with reference to the drawings, in which.

DETAILED DESCRIPTION

Figure 1:
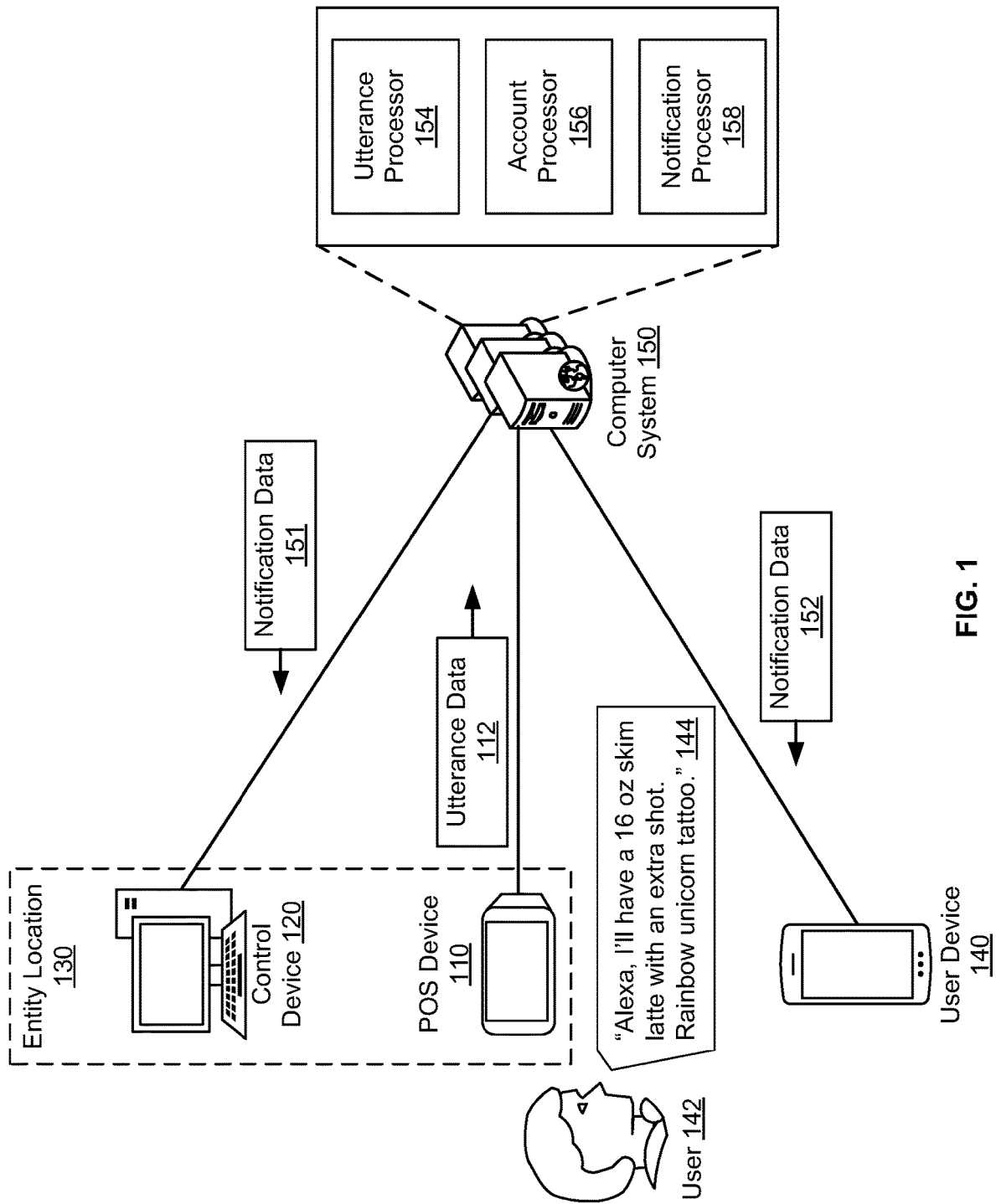
FIG. 1 illustrates an example of a computing environment for user account matching based on natural language utterances, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed, among other things, to natural language utterance-based use of computing devices. In an example, an entity may operate a computing device to provide various services to users. This computing device is associated with a first account of the entity with a service provider. The services are available to a user based on the first account of the entity and based on a second account of the user with the service provider. In particular, the first account stores entity data specific to the services of the entity, such as information about offers for items available based on or more of the services. In comparison, the second account stores user data specific to determining the second account and authenticating the user. For instance, the second account stores a set of words and a voice print to identify the second account. The computing device may execute an application of the service provider, where the application supports a voice-based user interface. Upon a natural language utterance of the user at the voice-based user interface, the computing device sends data indicative of the natural language utterance to a computer system of the entity. The natural language utterance may include a request for an offer and the set of words. The computer system determines, based on the data, information about the requested offer, the set of words, and a voice print. Further, the computer system determines a candidate set of accounts by matching the determined set of words with the sets of words associated with these accounts. From the candidate set, the computer system identifies the second account of the user by matching the determined voice print with the voice print associated with the second account. Based on the data being received from the computing device, the computer system looks-up the first account and determines a match between the information about the requested offer and an available offer. Accordingly, the computer system generates and stores a first association between the first account, an identifier of the user, and the available offer. Similarly, the computer system generates and stores a second association between the second account, an identifier of the entity, and the available offer. Data about the first association is sent to the computing device or to another computing device associated with the first account. Data about the second association is sent to a computing device associated with the second account.

To illustrate, consider an example of an entity that offers coffee, referred to as a coffee merchant, and a user that drinks coffee, referred to as a coffee drinker. The coffee merchant may deploy a computing device in a coffee store, where the computing device is associated with an account of the merchant with the service provider, referred to as a merchant account. The merchant account may include a catalog of coffees offered in the coffee store, such as lattes, espressos, etc. and the various cup sizes. An account of the coffee drinker with the service provider, referred to as a consumer account, may include three words usable to identify the consumer account (e.g., "rainbow unicorn tattoo") and a voice print of the coffee drinker. Upon receiving, from the computing device, data indicating a natural language utterance of the coffee drinker requesting a particular coffee drink (e.g., "I'll have a 16 ounce skim latte with an extra shot. Rainbow unicorn tattoo"), the service provider's computer system may determine a requested coffee drink (e.g., "16 ounce skim latte extra shot") and the three words (e.g., "rainbow unicorn tattoo"), and may generate a voice print from the data. The three words are matched with twenty-five consumer accounts that also use these words, from thousands of consumer accounts. The voice print is compared to voice prints of the twenty-five consumer accounts and matched with the coffee drinker's consumer account. The requested coffee drink is matched with a particular coffee drink available from the merchant account (e.g., "coffee: latte; size: 16 ounce; shots: 2"). The computer system generates an order for the particular coffee drink from the coffee merchant and charges the order to the consumer account, whereby this account is updated to show the order. In addition, the computer system generates a purchase order, identifying the particular coffee drink and the coffee drinker, updates the merchant account to show the purchase order, and/or sends the order to the computing device or to another computing device at the coffee store.

Embodiments of the present disclosure provide several technical advantages. In an example, a computing device is associated with an account of an entity with the service provider. Yet, the computing device is usable by any number of users that have different accounts with the entity. Hence, the availability of a voice-based user interface at the computing device to access services need not be limited to the entity only, but can be extended to the various users. In addition, by extending voice-based user interface's availability to many users, network latency and security issues arise. In particular, when the voice-based user interface receives a natural language utterance of a particular user, the account of the particular user needs to be identified from a very large number of accounts (which can be in the millions) within a very short period of time (e.g., in the milliseconds). Otherwise, the network latency is too large and degrades the quality of the voice-based user interface. By using the set of words to determine a candidate set of accounts and then matching a voice print to an account from the candidate set, meeting the latency specification (e.g., a few milliseconds) becomes possible. In addition, the voice print matching is used as a user authentication factor, thereby improving the security of using the voice-based user interface.

In the interest of clarity of explanation, various embodiments of the present disclosure are described in association with an entity offering items and a user requesting such items (e.g., a merchant and a consumer as in the illustrative example above). However, the embodiments of the present disclosure are not limited as such. Instead, the embodiments similarly apply to facilitating any type of services, including a service for offering items and requesting offers, via a voice-based user interface. In particular, a service is available via a computing device that provides the voice-based user interface. The availability of the service may depend on a first user account with which the computing device is associated and on a second user account. The first user account indicates data specific to the service. The second user account indicates data specific to a set of words and a unique user identifier. Data indicative of a natural language utterance may be processed to identify a requested service and a set of words. This data or a different type of data may be processed to determine the unique user identifier. The determined set of words and the determined unique user identifier are usable to identify the second user account. Associations between the two accounts, the requested service can be generated, stored, and used to provide notifications to different computing devices.

FIG. 1 illustrates an example of a computing environment for user account matching based on natural language utterances, according to embodiments of the present disclosure. As illustrated, the computing environment may include a point-of-sale (POS) device 110 and a control device 120 available at an entity location 130 of an entity, a user device 140 of a user 142, and a computer system 150 of a service provider. Each of the POS device 110, the control device 120, the user device 140 may be communicatively coupled with the computer system 150 over one or more data networks. A natural language utterance 144 of the user 142 is detected by the POS device 110 and sent to computer system 150 as utterance data 112. Upon processing the utterance data 112, the computer system 150 sends notification data 151 to the POS device 110 and/or the control device 120 and notification data 152 to the user device 140 about an outcome of the processing.

In an example, the user 142 may be at the entity location 130 and may speak the natural language utterance 144. The natural language utterance 144 may include, among other things, a wakeword, a requested offer, and a set of words usable to determine an account of the user 142 with the service provider. The set of words may be referred to herein as an account phrase for ease of reference. Although usable to determine the account, the set of words may be common to one or more accounts of other users and, hence, may not be unique to the user 142 or the user's 142 account. For instance, and as illustrated in FIG. 1, the user 142 may utter "Alexa, I'll have a 16 ounce skim latte with an extra shot. Rainbow unicorn tattoo." "Alexa" may be the wakeword. "I'll have a 16 ounce skim latte with an extra shot" may be the requested offer. And "rainbow unicorn tattoo" may be the account phrase.

The POS device 110 may receive the user utterance 144 via an audio sensor (e.g., a microphone), detect the wakeword, and generate the utterance data 112 in response to detecting the wakeword. The utterance data 112 may be an audio message that includes the requested offer and the account phrase (e.g., "I'll have a 16 ounce skim latte with an extra shot"). Although the use of a wakeword is illustrated in FIG. 1, the embodiments of the present disclosure are not limited as such. Instead, a particular user input may be received at the POS device 110, such as a button click, instead of the wakeword.

The POS device 110 may represent a computing device that includes a suitable memory(ies) storing computer-readable instructions and a suitable processor(s) for executing the computer-readable instructions. The computer-readable instructions may represent program code of an application available from the service provider. The application may support a voice-based interface at the POS device 110, among other functionalities. In particular, the application may detect the wakeword and generate the utterance data 112. The application may also present a text-to-speech (TTS) response based on the notification data 151 to indicate a status of the requested offer (e.g., "your 16 ounce skim latte with an extra shot has been ordered. Your order number is 1234"). The POS device 110 may also include a graphical user interface (GUI). If so, the application may present a text or graphical response on the GUI based on the notification data 151 to indicate the status (e.g., by presenting an image of the requested order, along with the order number).

The computer system 150 may represent a set of hardware servers and/or virtualized servers hosted within hardware systems. The computer system 150 may implement an utterance processor 154, an account processor 156, and a notification processor 158. The utterance processor 154 may receive the utterance data 112, generates words from the utterance data 112, determine a user intent, detect the account phrase from the words, and generate a voice print from a portion or the entire utterance data 112. The account processor 156 may use the account phrase to determine a candidate set of accounts and the voice print to identify a particular account of the user 142 from the candidate set. Given that the utterance data 112 was received from the POS device 110, the account processor 156 may also determine an account of the entity with the service provider and may match particular words with an offer for an item offered by the entity and identified in the entity's account. The notification processor 158 may generate and send the notification data 151 and the notification data 152 based on notification settings under the entity's account and the user's 142 account, respectively. Operations of the computer system 150 are further described in connection with the next figures.

The control device 120 may represent a computing device that includes a suitable memory(ies) storing computer-readable instructions and a suitable processor(s) for executing the computer-readable instructions. The computer-readable instructions may represent program code of an application (e.g., the same application as the one of the POS devices 110 or a different application). The application may generate, based on the notification data 151, data related to the requested offer and the user 142. For instance, this data my identify that a sixteen ounce skim latte with an extra shot has been requested by "user ABC" and the request number is "order 1234." The data can be presented at a user interface of the control device 120 and/or may be sent, as controls, to various systems of the entity at the entity location 130 to trigger and manage operations related to providing the requested offer to the user 142.

In addition, the entity may operate any of the control devices 120 and/or the POS device 110 to access the entity's account and review a history of offers requested. Although the control device 120 and the POS device 110 are illustrated as being located within a same entity location 130 (e.g., a brick and mortar store of the entity), the embodiments of the present disclosure are not limited as such. For instance, the control device 120 and/or the POS device 110 may be at different locations.

The user device 140 may represent a computing device that includes a suitable memory(ies) storing computer-readable instructions and a suitable processor(s) for executing the computer-readable instructions. The computer-readable instructions may represent program code of an application available from the service provider. The application may provide smart-assistant functionalities to the user 142, in addition to providing access to the user's 142 account. The application may generate, based on the notification data 152, data related to the requested offer and the entity. For instance, this data my identify that a sixteen ounce skim latte with an extra shot has been ordered from "entity XYZ" and the request number is "order 1234." The data can be presented at a user interface of the user device 140.

Although FIG. 1 illustrates a natural language utterance requesting an offer, the embodiments of the present disclosure are not limited as such. For instance, the embodiments similarly apply to a natural language utterance that requests multiple offers. The embodiments also apply to multiple natural language utterances, each of which requesting one or more offers, and at least one of such natural language utterances including the account phrase. Further, the embodiments apply to identifying the offers via other means that a natural language utterance(s) (e.g., by operating a graphical user interface, a keyboard, or a scanner to identify the offers), followed by a natural language utterance that includes the account phrase, and optionally, other words.

Figure 2:
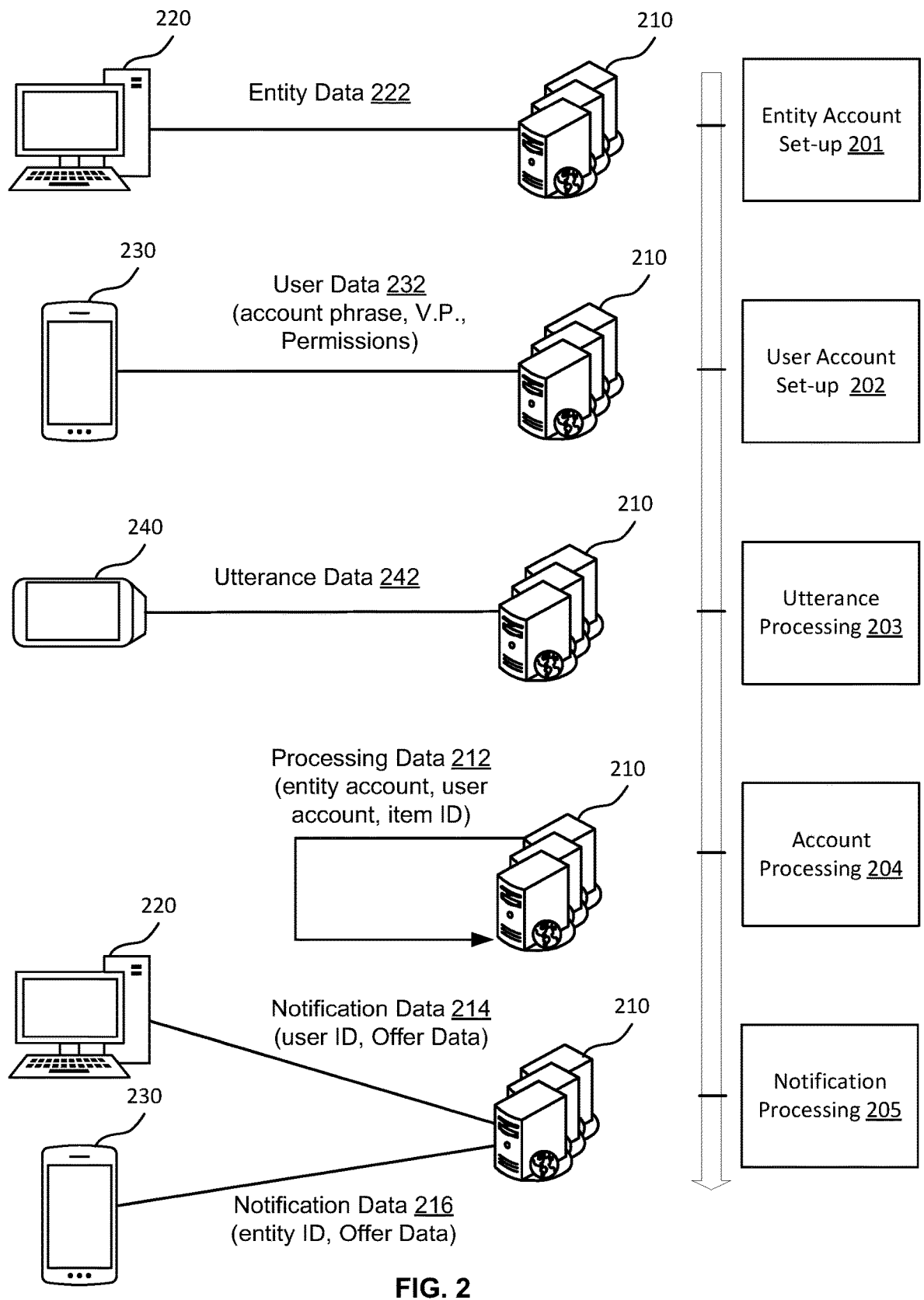
FIG. 2 illustrates an example of a set of stages for using an account phrase, according to embodiments of the present disclosure.

FIG. 2 illustrates an example of a set of stages for using an account phrase, according to embodiments of the present disclosure. As illustrated, the set may include an entity account set-up stage 201, a user account entity set-up stage 202, an utterance processing stage 203, an account processing stage 204, and a notification processing stage 205. A computer system 210 of a service provider (similar to the computer system 150 of FIG. 1) and different computing devices, some of which may be associated with an account of an entity (referred to as an entity account) and some of which may be associated with an account of a user (referred to herein as a user account), may be involved at each of the stages 201-205.

In an example, during the entity account set-up stage 201, the entity may operate a computing device 220 (similar to the control device 120 of FIG. 1) to send entity data 222 to the computer system 210. The entity data 222 may be usable to set-up the entity account. For instance, the entity data 222 may include login information to the entity account, a catalog of offers, each of which may correspond to one or more items offered from an entity location, and the number of POS devices at the entity location. The entity account set-up is further described in connection with FIG. 3.

During the user account set-up stage 202, the user may operate a computing device 230 (similar to the computing device 140 of FIG. 1) to send user data 232 to the computer system 210. The user data 232 may be usable to set-up the user account. For instance, the user data 232 may include login information to the user account, an account passphrase, a voice print of the user, and permission data to manage requests for offers. The user account set-up is further described in connection with FIG. 4.

During the utterance processing stage 203, the entity may operate a POS device 240 (e.g., one of the computing devices registered under the entity account and similar to the POS device 110 of FIG. 1). The POS device may receive a natural language utterance of the user and, in response, send utterance data 242 to the computer system 210. In turn, the computer system 210 may perform natural language processing, including natural language understanding (NLU) and automatic speech recognition (ASR) to determine an intent of the user (e.g., intent: offer request), words related to the intent, and the account passphrase. The computer system 210 may also perform speech sampling and a spectrogram algorithm to generate a voice print from the utterance data 242.

During the account processing stage 204, given the user intent, the computer system 210 may access the entity account and determine a match between the words and data associated with an offer from the catalog. The computer system 210 may also authenticate the user by, in part, using the account phrase to determine a candidate set of user accounts and using the voice print to identify the user account of the user. The computer system 210 may also update the entity account to indicate that the offer has been requested, identify the user, and specify a request number. Similarly, the computer system 210 may update the user account to indicate that the offer has been requested, identify the entity, and specify the request number. Updating the entity account and the user account may correspond to initiating a transaction between such two accounts. Other processing may be possible to complete the transaction. For example, completing the transaction may rely on a tokenization process that involves exchanging a token between the computer system 210 and the POS device 204 and/or the computing device 220. In this example, an outcome of the processing includes one or more tokens to be exchanged. In an additional example, completing the transaction may necessitate user input indicating a particular payment instrument to use. In this example, an outcome of the processing includes one or more requests for the payment instrument information. Outcomes of the processing is illustrated in FIG. 2 as processing data 212.

During the notification processing stage 205, the computer system 210 may send notification data 214 to the computing device 220 (or some other device registered under the entity account) and notification data 216 to the computing device 230 (or some other device registered under the user account). The notification data 214 may include some or all of the processing data. For example, the notification data 214 may include data about the requested offer, including data about (e.g., identifiers of) one or more of the items included in the offer, and the user, and/or may request the payment instrument information, among other things. Similarly, the notification data 216 may include some or all of the processing data. For example, the notification data 216 may include data about the requested offer and the entity, a token, and/or a request for a token, among other things. The utterance processing, the account processing, and the notification processing of stages 203-205 are further described in connection with FIG. 5.

Although FIGS. 1 and 2 describe embodiments of the present disclosure in connection with an entity account of an entity and a user account of a user, the embodiments are not limited as such. For example, an entity location may be managed by the service provider and/or may include computing devices managed by the service provider. In this example, an entity account may correspond to an account of the service provider (e.g., a service provider account). In another example, an entity location may be managed by an entity that has a user account (e.g., the entity is another user that does not makes offers). In this example, the entity account may correspond to the user account.

To illustrate, consider the following examples. In a first example, an entity is a merchant that offers items. The entity has an entity account (e.g., a merchant account) with the service provider, where this account stores information about the offers. A computing device is registered under the entity account and is located in a brick and mortar store where some or all of the offered items may be available. In this example, upon a natural language utterance of the user detected by the computing device and related to acquiring one of the items, a transaction can be completed between the user account and the entity account.

In a second example, an entity manages a space, such as a hotel. A computing device is located in the space and registered under the service provider account. The service provider may offer a catalog of items. In this example, upon a natural language utterance of the user detected by the computing device and related to acquiring one of the items, a transaction can be completed between the user account and the service provider account.

In a second example, an entity manages a space, such as a hotel or a house. A computing device is located in the space and registered under a user account of the entity. Here also, the service provider may offer a catalog of items. In this example, upon a natural language utterance of the user detected by the computing device and related to acquiring one of the items, a transaction can be completed between the user account of the user and the service provider account. The user account of the entity may not, but can, be updated to include data related to the transaction.

As used herein, a user account may refer to an account of a user that does not provide offers for items, an account of an entity that does not provide offers for items, an account of an entity that provides offers for items, and/or an account of the service provider. In the interest of clarity of explanation, an account of an entity is referred to herein as an entity account (including a merchant account) and the account of the service provider is referred to herein as a service provider account.

Figure 3:
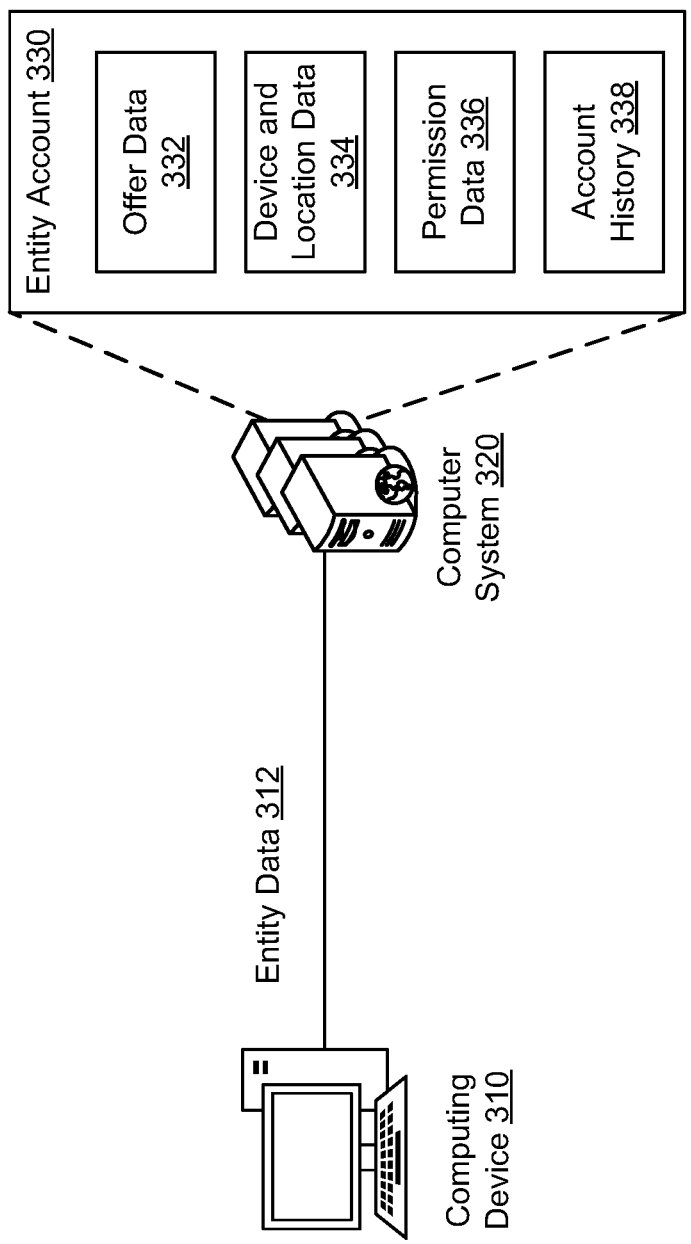
FIG. 3 illustrates an example of associating entity data, including offer data, with an entity account, according to embodiments of the present disclosure.

FIG. 3 illustrates an example of associating entity data 312, including offer data, with an entity account 330, according to embodiments of the present disclosure. As illustrated, an entity operates a computing device 310 (similar to the computing device 220 of FIG. 2) to send the entity data 312 to a computer system 320 of a service provider (similar to the computer system 210 of FIG. 2). In turn, the computer system 320 may generate and update the entity account 330 based on the entity data 312.

In an example, the entity data 312 may include data about offers for items, where the offers are available from the entity. The data can include identifiers of the items and parameters related to the offers (e.g., identifier of the offer, offered price, offered quantity, delivery method to provide the offered item, etc.). The entity data 312 may also identify one or more computing devices operable by the entity and available to users, and the associated locations of these entities. A location of a computing device can be a geographical location or can be data network locations (e.g., an internet protocol (IP) address). Further, the entity data 312 may specify an entity identifier usable to identify the entity to users (e.g., "entity XYZ"), fields to send in notification data (e.g., offer identifier, item identifier, user identifier, request identifier, and/or other fields), and/or whether account passphrases are usable to request offers.

The entity account 330 may include offer data 332, device and location data 334, permission data 336, and an account history 338, among other data. The offer data 332 may organize data about the offers in a catalog of offers that includes description, variation, substitutions, pricing, and other data related to offering items. The device and location data 334 may identify each of the entity's computing devices (e.g., with media access control (MAC)) and its location. The permission data 336 may set permissions and restrictions related to the use of each of the entity's computing devices by users. For instance, the permission data 336 may identify whether account passphrases are acceptable, specify how the entity should be identified to the users, and/or the fields of the notification data that should be received from the computer system 320. The account history 338 may include historical data about previous requests, offers that have been previously requested, and identifiers of users that have made such requests.

Although FIG. 3 illustrates that the entity account 330 is updated based on the entity data 312 received from the computing device 310, the embodiments of the present disclosure are not limited as such. For example, similar entity data can be retrieved from other data sources, including online sources. For instance, the entity may rely on other computing services of the computer system 320, including ones related to processing and managing transactions and payments (e.g., a cloud-based POS service). Item identifiers and offers can be retrieved from such computing services to update the entity account 330. In another illustration, the entity may have a web site describing items and the related offers. A web crawler, or some other computing service, can be implemented to retrieve the relevant data and update the entity account 330.

Figure 4:
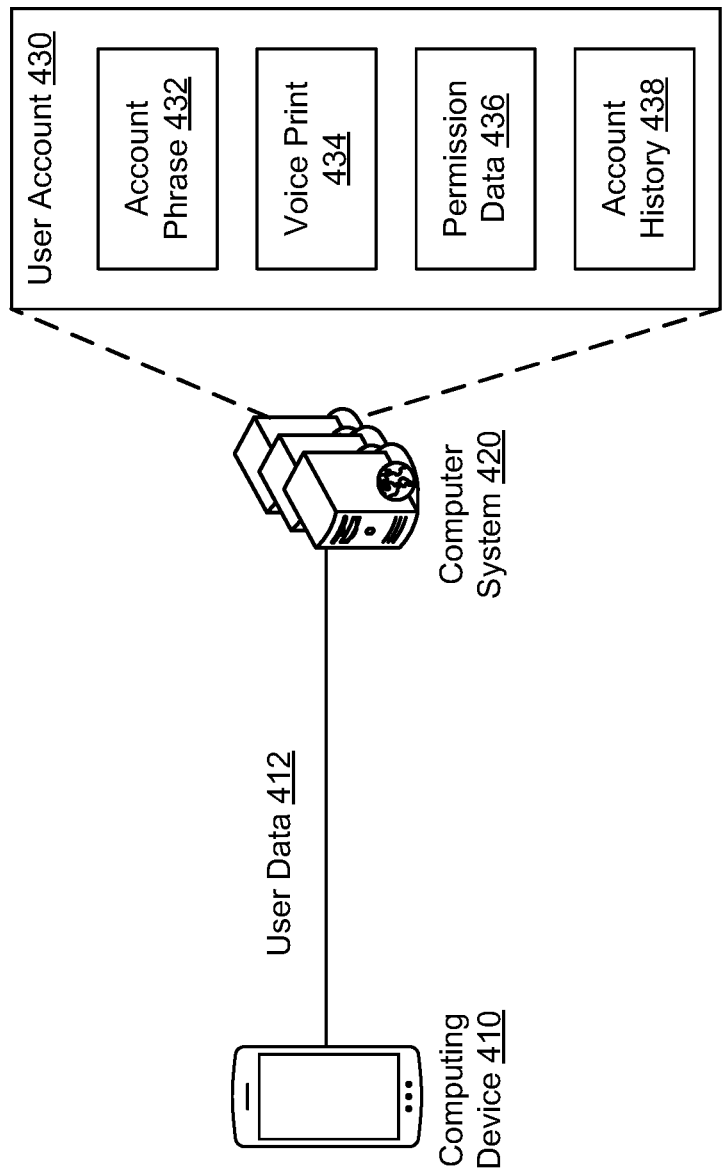
FIG. 4 illustrates an example of associating user data, including an account phrase and a voice print, with a user account, according to embodiments of the present disclosure.

FIG. 4 illustrates an example of associating user data 412, including an account phrase and a voice print, with a user account 430, according to embodiments of the present disclosure. As illustrated, a user operates a computing device 410 (similar to the computing device 230 of FIG. 2) to send the user data 412 to a computer system 420 of a service provider (similar to the computer system 210 of FIG. 2). In turn, the computer system 420 may generate and update the user account 430 based on the user data 412.

In an example, the user data 412 may indicate a set of words to identify the user account. For instance, the set of words can be defined based on a GUI at the computing device 410. In particular, the set of words are received at the GUI as user input and sent to the computer system 420. Alternatively, the set of words can be sent from the computer system 420 as a suggestion, the suggestion may be presented at the GUI, and a user selection of the set of words may be received back from the computing device 410. In another illustration, the set of words can be defined by using a voice-based user interface at the computing device 410. In particular, the voice-based user interface may receive a natural language utterance including the set of words and may send utterance data, as the user data 412, indicating the set of words. The computer system 420 may derive the set of words by performing natural language processing on the utterance data. Alternatively, rather than the user uttering the set of words, the computer system 420 may send the set of words to the computing device as a suggestion. The voice-based user interface may present a TTS playing the set of words and may receive a user selection of the section. The computer system 420 may in turn receive the user selection.

The user data 412 may also indicate parameters associated with a voice print of the user. For instance, the user data 412 includes audio data corresponding to a natural language utterance of a phrase by the user. The phrase may, but need not, have been indicated by the computer system 420 to the computing device 410. The computer system 420 may derive the voice print by performing speech sampling and a spectrogram algorithm on the audio data. In another illustration, the user data 412 indicates a permission for the computer system 420 to generate and update the voice print over time. As utterance data is received over time from the computing device 410 and any other device associated with the user account 430, the computer system 420 may generate audio samples from the utterance data. Per the permission, the computer system 420 may derive and update the voice print from the audio samples.

Further, the user data 412 may specify a user identifier usable to identify the user to entities (e.g., "user ABC"), fields to send in notification data (e.g., offer identifier, item identifier, entity identifier, request identifier, and/or other fields), and/or permissions and restrictions associated with the use of the set of words and the voice print (e.g., a list of permitted entities, list of restricted entities, permitted use locations, restricted use locations, permitted use for particular offer and/or item types, restricted use for other offer and/or item types, permitted parameters of offer requests (e.g., total value), restricted parameters of offer requests, etc.).

The user account 430 may include an account passphrase 432, a vice print 434, permission data 436, and an account history 438, among other data. The account passphrase 432 may correspond to the set of words determined by the computer system 420 from the user data 412. The voice print 434 may correspond to the voice print derived by the computer system 420 based on the user data 412. The permission data 436 may set permissions and restrictions related to the use of account passphrase 432 and/or the voice print 434 and may indicate permitted notifications that can be sent to one or more computing devices associated with the user account 430. The account history 438 may include historical data about previous requests, offers that have been previously requested, and identifiers of entities from which the requests were made.

Although FIG. 4 describes that a one-to-one association between an account phrase and a user account and a one-to-one association between a voice print and the user account, the embodiments of the present disclosure are not limited as such. Instead, the embodiments similarly apply to one-to-many, many-to-one, and many-to-many associations. For instance, the user may be associated with two user accounts. The same account phrase may be associated with both accounts. In this case, permission data may indicate one or more parameters for using one of the two user accounts (e.g., a default user account, a request to ask the user before selecting one of the user accounts, a selection of one of the user accounts based on the type of the requested offer and/or item, the entity, the parameters of the request (e.g., total value, etc.). In another illustration, a user account is associated with two users and stores voice prints corresponding to these two users. The same account phrase or two different account phrases can be used, each defined based on input of one of the two users.

Figure 5:
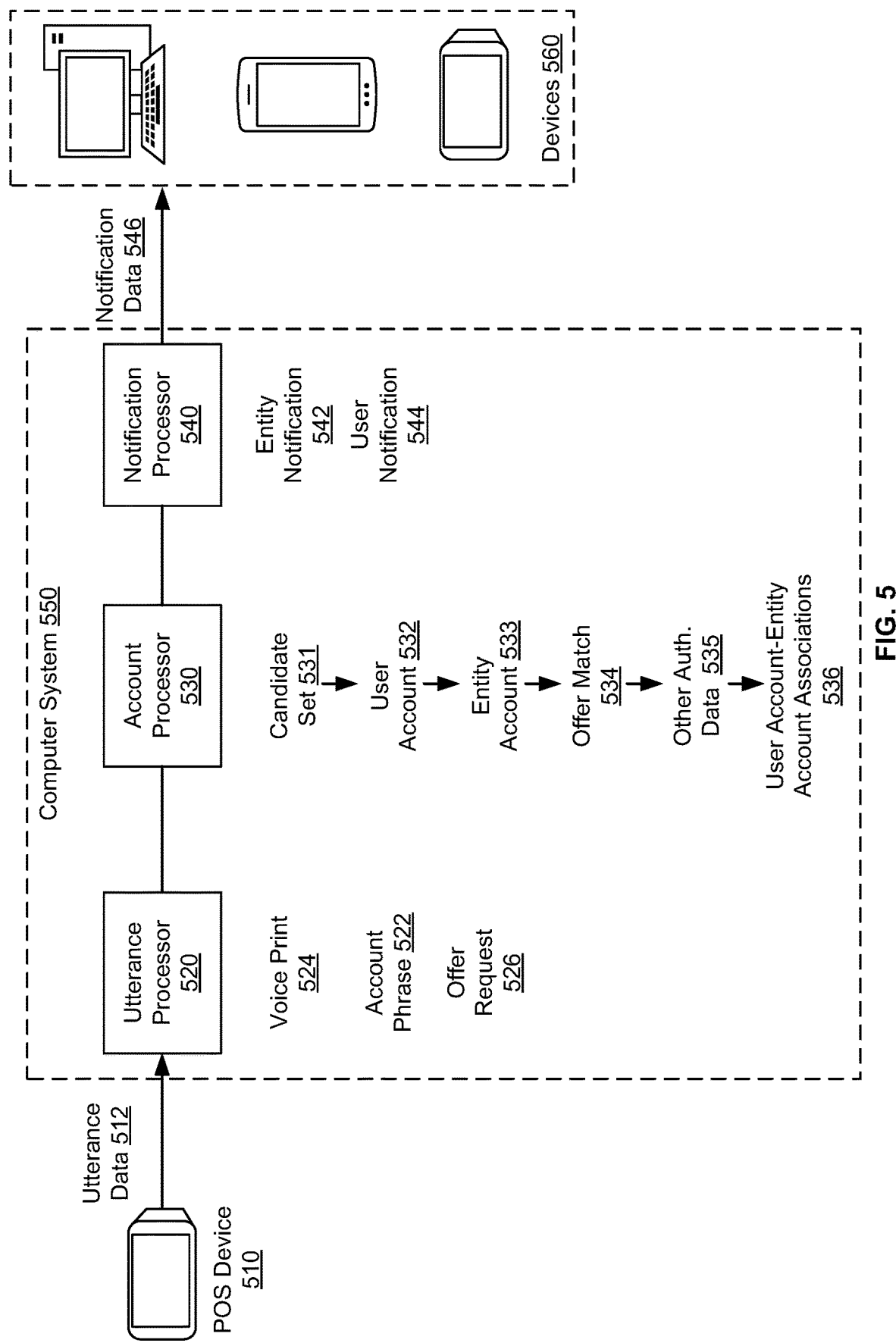
FIG. 5 illustrates an example of processing a natural language utterance to update user and entity accounts, according to embodiments of the present disclosure.

FIG. 5 illustrates an example of processing a natural language utterance to update user and entity accounts, according to embodiments of the present disclosure. As illustrated, a computer system 550 (similar to the computer system 210 of FIG. 2) may receive utterance data 512 from a POS device 510 (similar to the POS device 240 of FIG. 2). The utterance data 512 may represent audio data of a natural language utterance by a user that has a user account. The POS device may be registered under an entity account of an entity. Upon processing of the utterance data, the computer system 550 may generate and send notification data 546 to one or more devices 560 including, for instance, any of the POS device 510, a computing device registered under the entity account, and a computing device registered under the user account.

In an example, the computer system 550 may include an utterance processor 520, an account processor 530, and a notification processor 540, among other computing components. The utterance processor 520 may receive the utterance data 512 (e.g., "I'll have a 16 ounce skim latte with an extra shot. Rainbow unicorn tattoo"). The utterance processor 520 may sample a portion or the entire utterance data 512 to generate an audio sample. Generally, the longer the audio sample, the better the quality of a generated voice print may be. The utterance processor 520 may also input the audio sample to a spectrogram algorithm to generate a voice print 524.

Further, the utterance processor 520 may input the utterance data 512 to an ASR process to generate text data identifying words present in the utterance data 512. The text data may be input to an NLU process to detect an intent of the utterance 512 (e.g., "intent: offer request"), first specific words related to the intent (e.g., "words: 16 ounce; skim latte; extra shot"), and second specific words related to an account phrase (e.g., "account phrase: rainbow unicorn tattoo"). Given the intent, the utterance processor 520 may select the account processor 530 as a next computing service from a plurality of computing services available from the computer system 550, where the selection may be based on association between the intent and the account processor 530 (e.g., the association indicates that the account processor 530 is a destination for any "intent: offer request"). The utterance processor 520 may output, to the account processor 530, the voice print 524, an account phrase 522 that includes the second specific words (e.g., "account phrase: rainbow unicorn tattoo"), and an offer request 526 that includes the first specific words (e.g., "words: 16 ounce; skim latte; extra shot").

The account processor 530 may use the account phrase 522 in a query to a data store that associates account phrases with user accounts. For instance, the data store may be a database or some other data structure available from a network location or stored in the cache of a local memory of the computer system 550. The query result may identify specific user accounts associated with the account phrase 522 (e.g., storing the account phrase) and these user accounts represent a candidate set 531 of user accounts against which the voice print 524 can be compared. In particular, the account processor 530 may look-up the voice print associated with (e.g., stored in) each user account from the candidate set 531 to determine a best match with the voice print 524. The user account 532 associated with the best match may be identified as the account of the user that spoke the natural language utterance.

Based on an identifier of the POS device 510 received with the utterance data 512, the account processor 530 may identify an entity account 533 of the entity. The entity account 533 may store a catalog of offers available from the entity. The account processor 530 may compare the offer request 526 to the catalog to determine a match with at least one offer from the catalog. An offer match 534 may be generated and may identify the matched offer(s), the offered item(s), the user, and the entity (e.g., "offer: 16 ounce; skim latte; extra shot," "user: user ABC," "entity: entity XYZ"). The user identifier in the offer match 534 may be available from the user account 532. Similarly, the entity identifier in the offer match 534 may be available from the entity account 533.

The account phrase 522 and the voice print 524 may be used as authentication factors to authenticate the user by determining the user account 532 specific to the user. Other authentication data 535 may also be available to the account processor 530 to supplement the user authentication. This authentication data 535 may be automatically used by the account processor 530 or may be used upon a trigger event. An example trigger event corresponds to any of a confidence level associated with the generating of the account phrase 522, with the generating of the voice print 524, with the determining of the candidate set 531, or with the determining of the user account 532 falling below a predefined confidence threshold. Examples of the authentication data 535 may include a location of the computing device associated with the user, a location of the POS device 510, a history of requests of offers by the user (e.g., associated with the user account 532), a history of use of the account passphrase 522, a history of requests of offers from the entity (e.g., associated with the entity account 533), a user input at the computing device associated with the user (e.g., the user input indicating or confirming a request for the offer), or a user input at the POS device (e.g., the user input indicating or confirming the request).

Further, the account processor 530 may generate user account-entity account associations 536. For instance, the account processor 530 may generate a first association between the offer match 534 and the user account 532 to indicate that the offer is requested from the entity. The account processor 530 may also generate a second association between the offer match 534 and the entity account 533 to indicate that the offer is requested by the user. The first association may be stored under the user account 532, whereas the second association may be stored under the entity account 533. The account processor 530 may also initiate a payment process, whereby a payment instrument identified in the user account 532 may be processed, and funds may be sent to a receivable account identified in the entity account 533.

The account-entity account associations 536 may be input to the notification processor 540 that may, in response, generate and output the notification data 546 to the devices 560. For instance, the notification processor 540 may generate an entity notification 542 including the second association upon the successful completion of the payment process. This entity notification 542 may represent a purchase order identifying the offer, the item, the user, and a request number. Similarly, the notification processor 540 may generate a user notification 544 including the first association upon the successful completion of the payment process. This user notification 544 may represent a user order identifying the offer, the item, the entity, and the request number. The entity notification 542 and the user notification 544 may be sent as portions of the notification data 546 upon a request from one or more of the devices 560 and/or as a push to one or more of the devices 560.

Figure 6:
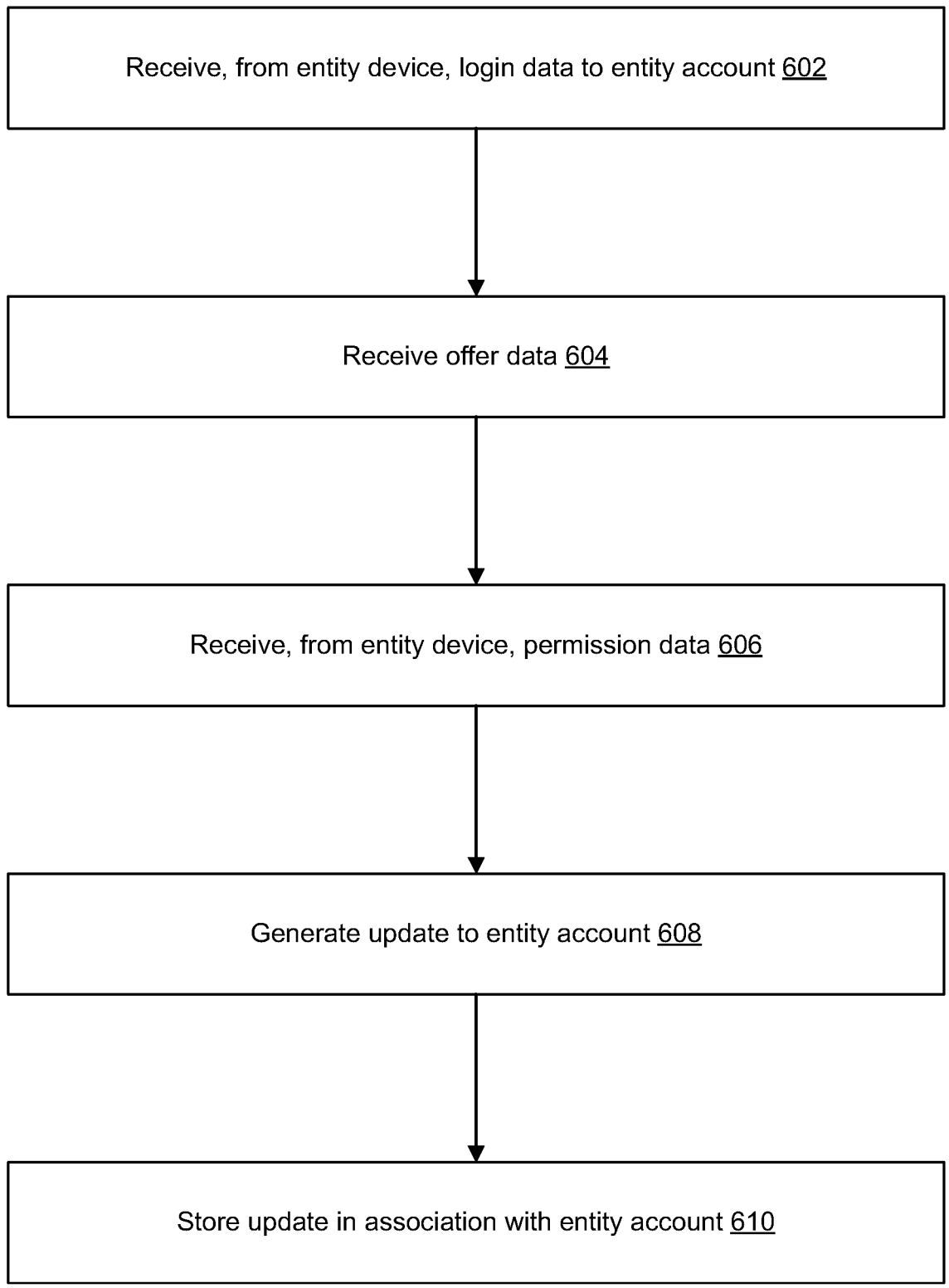
FIG. 6 illustrates an example of a flow for associating entity data with an entity account, according to embodiments of the present disclosure.
Figure 7:
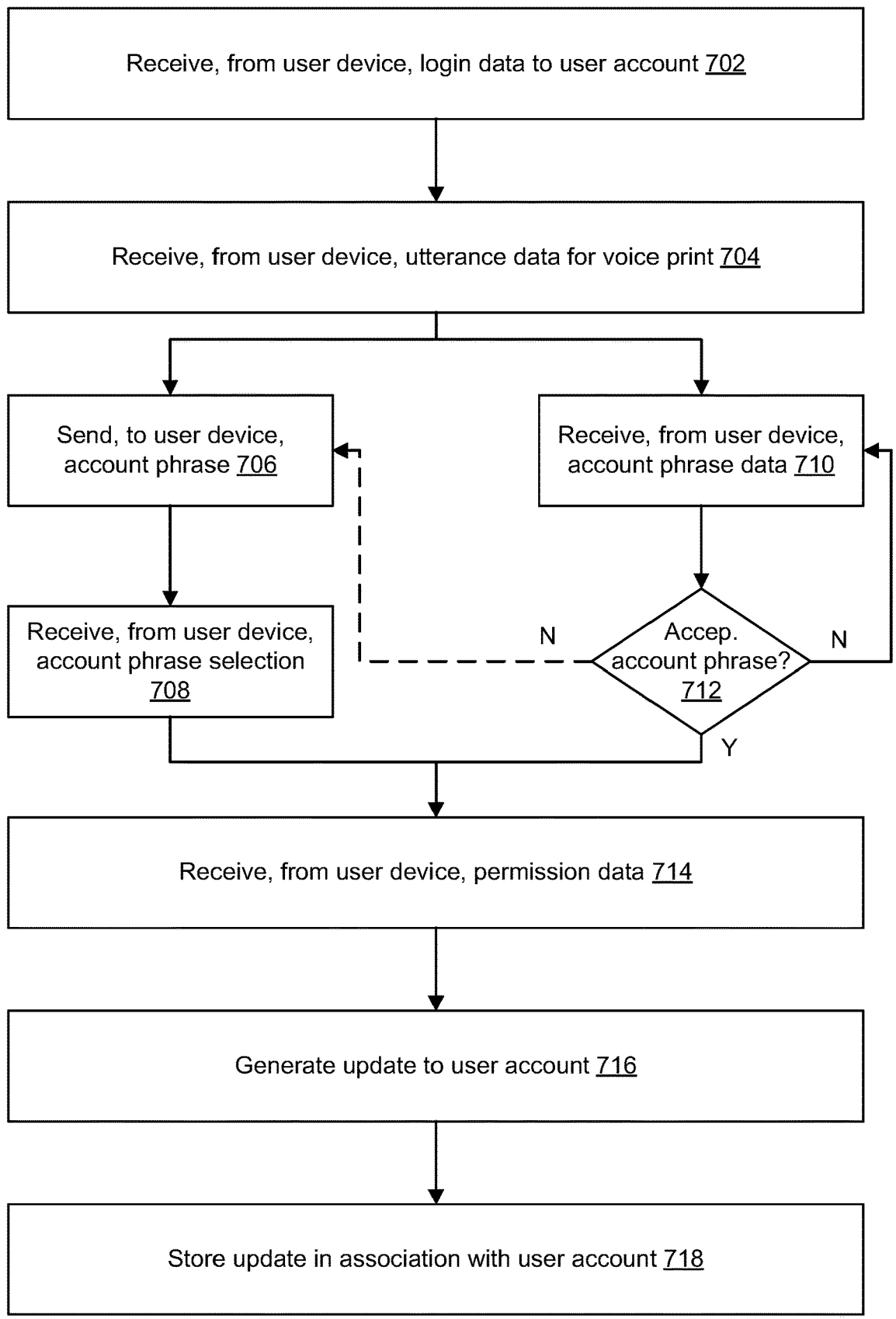
FIG. 7 illustrates an example of a flow for associating user data with a user account, according to embodiments of the present disclosure.
Figure 8:
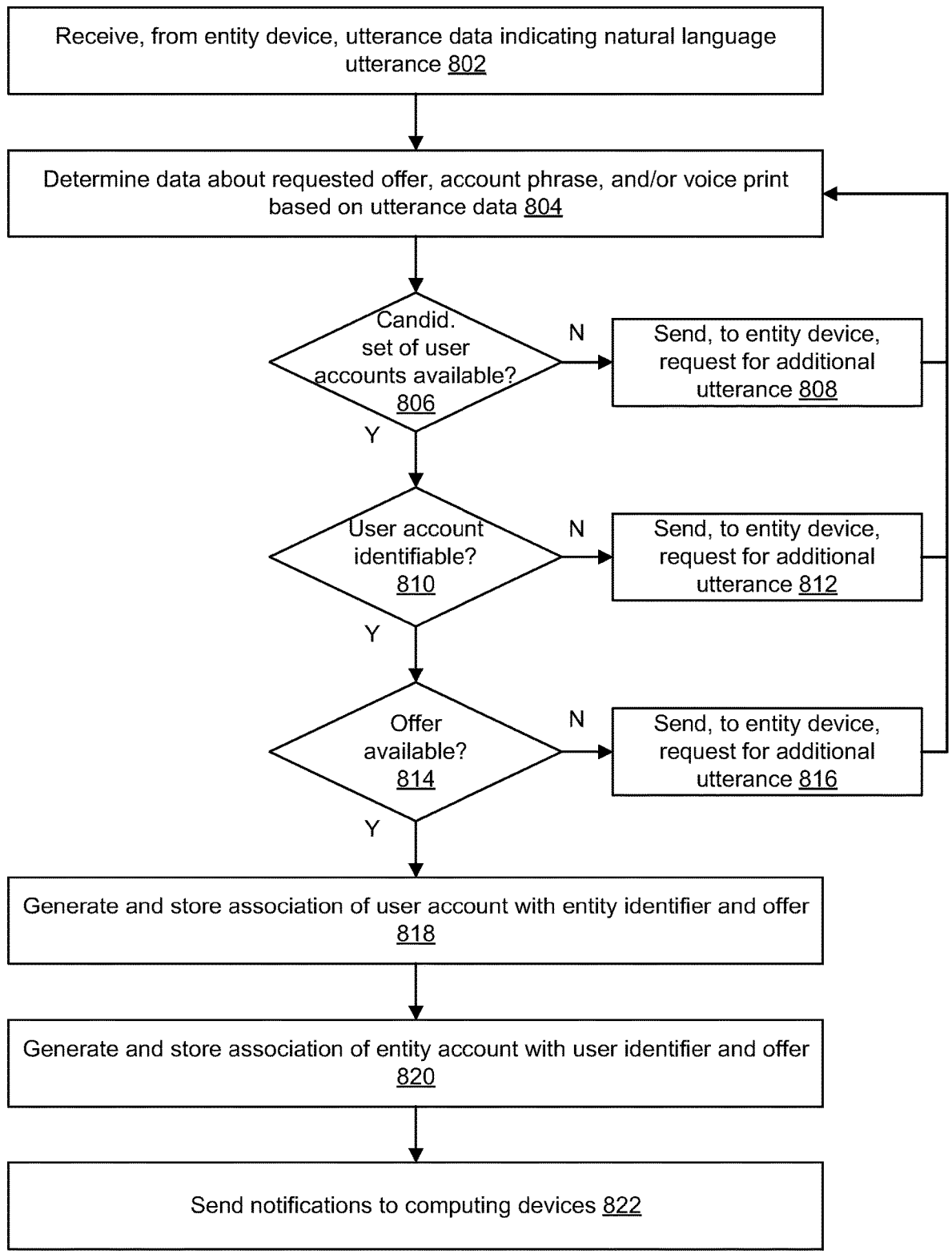
FIG. 8 illustrates an example of a flow for processing data related to a natural language utterance to update user and entity accounts, according to embodiments of the present disclosure.

FIGS. 6-8 show illustrative flows related to using account phrases in association with the processing of utterance data, in accordance with various embodiments. Some or all of instructions for performing the operations of the illustrative flows can be implemented as hardware circuitry and/or stored as computer-readable instructions on a non-transitory computer-readable medium of a computer system, such as the computer system 550 of FIG. 5. As implemented, the instructions represent modules that include circuitry or code executable by a processor(s) of the computer system. The use of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

FIG. 6 illustrates an example of a flow for associating entity data with an entity account, according to embodiments of the present disclosure. The associating may include updating the entity account such that a computing device registered under the entity account becomes usable by users having their own user accounts.

The flow may start at operation 602, where the computer system may receive, from an entity device, login data to the entity account. For instance, the entity device may be a computing device operated by an entity having the entity account. The login data may include a username and a password, or some other credentials, to authenticate the entity to the computer system. Upon a successful login, the entity account may become accessible to the entity.

At operation 604, the computer system may receive, offer data. For instance, the offer data my include identifiers of items offered by the entity, identifiers of location where the items are offered, parameters of the offers (e.g., variations, substitutions, prices), and/or descriptions of the items. The offer data can be received from the entity device and/or from another data source(s) as described in connection with FIG. 3.

At operation 606, the computer system may receive, from the entity device, permission data. For instance, the permission data may include an entity identifier (e.g., a nickname) to use for identifying the entity to users, parameters for sending notifications to the entity (e.g., fields of the notifications, entity devices to receive the notifications), and/or indications of whether account passphrases are usable per location or POS device.

At operation 608, the computer system may generate an update to the entity account based on the offer data and the permission data. For instance, the update may include a catalog of the offers. The catalog may list the items and the associated offers, offer descriptions, offer parameters, and location identifiers. The update may also include the entity identifier, permissions and restrictions, and notification settings.

At operation 610, the computer system may store the update in association with the entity account. For instance, the update is stored as multiple fields under the entity account.

FIG. 7 illustrates an example of a flow for associating user data with a user account, according to embodiments of the present disclosure. The associating may include updating the user account such that the user is able to use an account passphrase at computing devices registered under entity accounts.

The flow may start at operation 702, where the computer system may receive, from a user device, login data to the user account. For instance, the user device may be a computing device operated by the user having the user account. The login data may include a username and a password, or some other credentials, to authenticate the user to the computer system. Upon a successful login, the user account may become accessible to the user.

At operation 704, the computer system may receive, from the user device, utterance data for a voice print. For instance, the computer system may send data (e.g., text or audio) indicating a particular phrase for presentation at a user interface (e.g., GUI or voice-based user interface) of the user device. In return, the user device may detect a natural language utterance of the user repeating the phrase and may send the utterance data representative of the natural language. In another illustration, the computer system may not send the data to solicit the natural language utterance. Instead, utterance data may be received over time from the user device and other devices associated with the user. In both illustrations, the computer system may derive a voice print of the user from the received utterance data.

At operation 706, the computer system may send, to the user device, an account phrase for presentation at the user interface. For instance, the account phrase may be presented as a suggestion. The computer system may generate the account phrase based on a set of rules. The rules may specify a minimum number and a maximum number of words in the account phrase. The rules may also prohibit the use of particular words (e.g., obscene words, words that can commonly correspond to offers and/or items offered from entities). The computer system may also track (e.g., by maintaining a counter), the number of times a particular account phrase has been associated with user accounts (e.g., the total number of users that registered the particular account phrase to their user accounts). The rules may specify a maximum number of times, such that if that number is exceeded, the particular account phrase may no longer be suggestable.

At operation 708, the computer system may receive, from the user device, a selection of the account phrase. For instance, the selection may be received at the user interface in response to the presentation of the suggestion and the user device may send data indicating the selection to the computer system.

Operations 710-712 may be performed alternatively to operations 706-704, where the user may specify the account phrase rather than the computer system making a suggestion. In particular, at operation 710, the computer system may receive, from the user device, account phrase data. For instance, the account phrase is received at the user interface (e.g., as a natural language utterance or as text input). The corresponding data (e.g., utterance data or text data) may be sent from the user device to the computer system as the account phrase data. The received account phrase data indicates a request from the user to associate a particular account phrase with their user account.

At operation 712, the computer system may determine whether the requested account phrase may be acceptable or not. For instance, the computer system may derive the requested account phrase from the account phrase data (e.g., based on natural language processing in case of utterance data) and may apply the set of rules to the requested account phrase. If the requested account phrase satisfies the rules (e.g., number of words between the minimum and maximum numbers, does not include prohibited words, has not been associated with other user accounts over the maximum number of times), the computer system may find it acceptable and operation 714 may follow operation 712. Otherwise, the computer system may send feedback data to the user device indicating that the account phrase is not acceptable and requesting a new account phrase, as indicated with the loop back to operation 710. Additionally or alternatively, the computer system may send a suggested account phrase, as illustrated with the arrow to operation 706.

At operation 714, the computer system may receive, from the user device, permission data. For instance, the permission data may include a user identifier (e.g., a nickname) to use for identifying the user to entities, parameters for sending notifications to the user (e.g., fields of the notifications, user devices to receive the notifications), and/or indications of a permissions and restrictions associated with the use of the account phrase and the voice print (e.g., a list of permitted entities, list of restricted entities, permitted use locations, restricted use locations, permitted use for particular offer and/or item types, restricted use for other offer and/or item types, permitted parameters of offer requests (e.g., total value, restricted parameters of offer requests, etc.).

At operation 716, the computer system may generate an update to the user account. For instance, the update may include the voice print, the account phrase, the user identifier, permissions and restrictions, and notification settings.

At operation 718, the computer system may store the update in association with the user account. For instance, the update is stored as multiple fields under the user account.

FIG. 8 illustrates an example of a flow for processing data related to a natural language utterance to update user and entity accounts, according to embodiments of the present disclosure. The natural language utterance may indicate a request of a user having the user account for an offer from an entity having the entity account. The update may indicate that the offer has been requested and may notify the user and the entity about the status of the request.

The flow may start at operation 802, where the computer system may receive, from an entity device, utterance data indicating the natural language utterance of the user. For instance, the entity device may be a computing device at an entity location and registered under the entity account. The entity device may provide a voice-based user interface that may receive the natural language utterance. Upon a detection of a wakeword included in the natural language utterance, the entity device may send the utterance data. The computer system may receive the utterance data along with an identifier of the entity device (e.g., its MAC address).

At operation 804, the computer system may determine data about a requested offer, an account phrase, and/or a voice print based on the utterance data. For instance, the computer system may perform natural language processing on the utterance data to determine an intent and words. The intent may indicate the requested offer. Specific words may be determined as being related to the intent and these words may be set as the data, including a description, about the requested offer. Other words may be determined as being unrelated to the intent. Given the location of these words within the utterance data, the adjacency to each other, and their number (e.g., three consecutive words at the end of the utterance data), the computer system may set these words as the account phrase. Further, the computer system may generate the voice print by performing speech sampling and a spectrogram algorithm on the utterance data. In addition, the computer system may output a confidence level associated with the account phrase and/or the voice print. The confidence level may indicate the accuracy of the natural language processing and/or the voice printing.

At operation 806, the computer system may determine whether a candidate set of user accounts can be determined based on the account phrase. If the candidate set is determined, operation 810 may follow operations 806. Otherwise, operation 808 may follow operation 806. Different techniques may be available for performing this determination. In one example, the computer system may maintain a data store listing account phrases and their associations with user accounts. In this example, the computer system may use the account phrase in a query to the data store. The query result may identify particular user accounts that are associated with the account phase. These user accounts form the candidate set. If the query result returns an empty set, no match is found and operation 808 may be performed. In a further example technique, the confidence level of the account phrase may be used prior to querying the data store. If the confidence level exceeds a confidence threshold, the querying may be performed. However, if the confidence level is lower than a confidence threshold, the querying may not be performed and, instead, operation 808 may be performed. In yet a further example technique, the query result may indicate, for each identified user account, a confidence level of the match between the account phrase and the identified user account. Here, if the confidence level is lower than a confidence threshold, the identified user account is not added to the candidate set. If the candidate set is empty despite the query result identifying potential user accounts, operation 808 may be performed. The computer system can define the various confidence thresholds based on a number of parameters. For instance, a confidence threshold is set to a predefined or default value. Given the type and/or value of the requested offer (e.g., the price of the offered item), the location of the entity device, a location of a user device associated with the user (e.g., the user's mobile device), the user account, the entity account, a history of requests from the entity, a history of requests of the user, and/or a history of uses of the account phrase by the user, the computer system may adjust the confidence threshold. For instance, if any of such parameters indicate potential fraudulent behavior, the confidence threshold may be increased.

At operation 808, the computer system may have determined that no candidate set is available because no acceptable match with the account phrase was determined. Accordingly, the computer system may send, to the entity device, a request for an additional utterance (or some other input by the user, such as a GUI input). In turn, the entity device may present a TTS indicating that the use of their account phrase was not successful and requesting the user to repeat their account phrase. If a natural language utterance is performed, operation 804 may follow operation 808, where the computer system may re-determine at least the account phrase.

At operation 810, the computer system may determine whether a particular user account can be identified from the candidate set. If the particular user account is identified, operation 814 may follow operations 810. Otherwise, operation 812 may follow operation 810. In an example, the computer system may use the voice print in a look-up of the user account from the candidate set to determine a best match. The user account having the best match (e.g., the voice print stored therein matching the voice print determined at operation 804) may be set as the particular user account. If no match is found, operation 812 may be performed. Here also, confidence levels may be used. For instance, if the confidence level of the voice print is smaller than a confidence threshold, operation 812 may be performed. In another illustration, each match may also be associated with a confidence level. If the best match's confidence level is smaller than a confidence threshold, operation 812 may also be performed. The confidence thresholds can be set based on the parameters described in connection with operation 806.

At operation 812, the computer system may have determined that a candidate set is available, but that no voice print match was found. Accordingly, the computer system may send, to the entity device, a request for an additional utterance (or some other input by the user, such as a GUI input). In turn, the entity device may present a TTS indicating that no user account was found and requesting the user to repeat their request or a particular phrase. If a natural language utterance is performed, operation 804 may follow operation 808, where the computer system may re-determine at least the voice print and, potentially, the account phrase.

In an example, a location-based search may be performed as an optimization for determining the candidate set and/or matching the voice print. In particular, the location of the entity device may be determined from the entity account. The data store may also store associations between account phrases and user locations (e.g., home locations). The computer system may set a search region that includes the entity device's location (e.g., "search region: Seattle") and determine, from the data store, user accounts that are associated with the account phrase and the search region (e.g., such user accounts are associated also with "Seattle" as a home location). If no match exists (e.g., no user accounts identified), the computer system may change the search region (e.g., increase its geographical coverage to include other areas). If the candidate set was not empty (e.g., user accounts identified), but no match exists with the voice print, the computer system can similarly change the search region.

At operation 814, the computer system may determine whether an offer can be identified (e.g., the requested offer is available). If the offer is identified, operation 818 may follow operations 814. Otherwise, operation 816 may follow operation 814. In an example, the computer system may identify the entity account based on the device identifier of the entity device and may retrieve the catalog of offers stored under the entity account. The computer system may compare the data about the requested offer determined at operation 804 with the catalog of offers to find a match. If no match is found, operation 816 may be performed. Here also confidence levels may be used. For instance, if the confidence level is smaller than a confidence threshold, operation 816 may be performed. In another illustration, if the match has a confidence level smaller than a confidence threshold, operation 816 may also be performed. The confidence thresholds can be set based on the parameters described in connection with operation 806.

At operation 816, the computer system may have determined that no offer was found. Accordingly, the computer system may send, to the entity device, a request for an additional utterance (or some other input by the user, such as a GUI input). In turn, the entity device may present a TTS indicating that no offer was found and requesting the user to repeat their request or identify the offer. If a natural language utterance is performed, operation 804 may follow operation 808, where the computer system may re-determine at least the data about the requested offer, and potentially the voice print and the account phrase.

Although operations 806-816 are described in connection with a loop back to operation 804, the embodiments of the present disclosure are not limited as such. Instead, if any, a combination, or all of the conditions are determined to be "no" conditions, the flow may trigger a manual checkout process prior to proceeding to operation 818. For instance, if no candidate set is identified (e.g., this set is empty), no user account is identified, no offer match is determined, and/or potentially fraudulent activity is detected, the manual checkout process may be triggered. This manual checkout process may involve presenting information about the requested offer, the entity, and/or the user, receiving a confirmation of the entity and/or user to proceed forward, and/or receiving payment instrument information based on a manual input at an input device (e.g., a credit card swipe at a POS device with a magnetic strip).

At operation 818, the computer system may generate and store an association between the user account with the entity identifier and the offer that was found (e.g., an offer identifier of such offer). For instance, the association is generated upon successful processing of a payment instrument available indicated in the user account. The computer system may store the association as a user order that identifies the entity and the offer.

At operation 820, the computer system may generate and store an association between the entity account with the user identifier and the offer that was found (e.g., the offer identifier). For instance, the association is generated upon successful processing of the payment instrument. The computer system may store the association as a purchase order that identifies the user and the offer.

At operation 822, the computer system may send notifications to computing devices. For instance, the computer system may send a notification to the computing device indicating that the request for the offer was processed. In turn, the computing device may play a TTS indicating this status as a response to the user's natural language utterance. Based on notification settings, the computer system may also link the purchase order to a control device of the entity and/or the user order to the computing device of the user.

Figure 9:
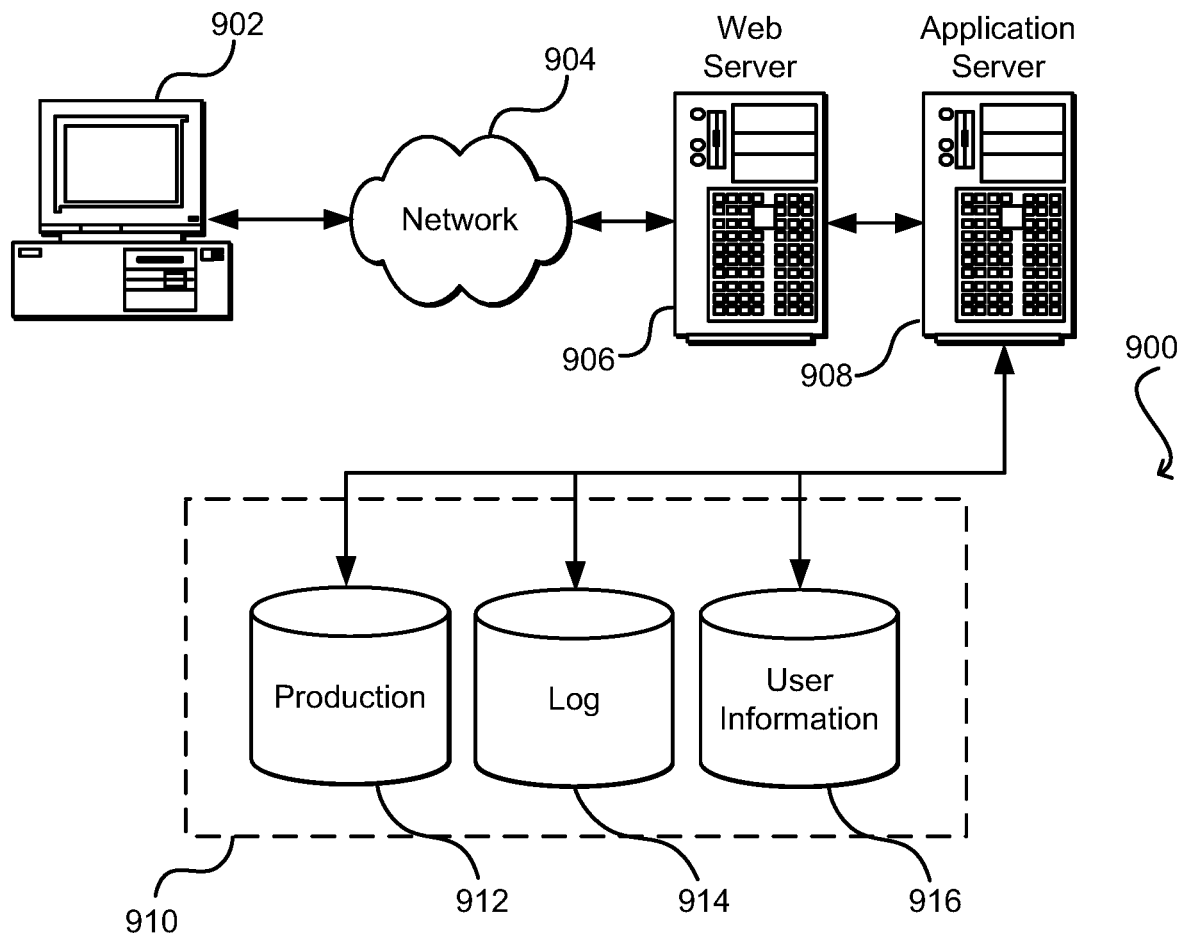
FIG. 9 illustrates aspects of an example environment for implementing aspects in accordance with various embodiments.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java °, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

What is claimed is:

1. A method implemented by a computer system, the method comprising:
   associating a first set of words with a first user account of a user, the first user account further associated with a first user identifier and a first voice print;
   receiving, from a first computing device of an entity that is associated with an entity account, first audio data generated by the first computing device, the entity account further associated with an entity identifier, the first audio data corresponding to a natural language utterance of the user;
   determining, based at least in part on natural language processing of the first audio data, (i) a request for an offer, and (ii) a second set of words unrelated to the request, the request corresponding to a first portion of the natural language utterance, the second set of words corresponding to a second portion of the natural language utterance;
   determining a set of candidate user accounts based at least in part on matching, for each candidate user account, the first set of words and the second set of words, the set of candidate user accounts comprising the first user account;
   generating a second voice print based at least in part on second processing of the first audio data;
   determining, from the set of candidate user accounts, that the first audio data is associated with the first user account based at least in part on matching the first voice print and the second voice print;
   determining a match between the request and offer information associated with the entity account;
   associating, based at least in part on the match, the first user identifier with the entity account;
   associating, based at least in part on the match, the entity identifier and the offer with the first user account;
   sending, to at least one of the first computing device or a second computing device associated with the entity account, second data indicating the first user identifier and the offer; and
   sending, to a third computing device associated with the first user account, third data indicating the entity identifier and the offer.

2. The method of claim 1, wherein associating the first set of words with the first user account comprises:
   receiving, from a user device, fourth data corresponding to a user input at the user device, the fourth data indicating the first set of words, the user device comprising at least one of: the third computing device or a fourth computing device associated with the first user account; and
   storing, based at least in part on the fourth data, the first set of words in association with the first user account.

3. The method of claim 2, wherein associating the first set of words with the first user account further comprises:
   determining at least one of: (i) a size of the first set of words is equal to or greater than a predefined size, or (ii) a number of user accounts associated with the first set of words is smaller than a predefined number,
   wherein the first set of words is stored based at least in part on at the at least one of: (i) the size being equal to or greater than the predefined size, or (ii) the number being smaller than the predefined number.

4. The method of claim 1, wherein associating the first set of words with the first user account comprises:
   sending, to a user device, fourth data indicating the first set of words, the user device comprising at least one of: the third computing device or a fourth computing device associated with the first user account;
   receiving, from the user device, fifth data corresponding to a user input at the user device, the fifth data indicating a user selection of the first set of words; and
   storing, based at least in part on the fifth data, the first set of words in association with the first user account.

5. A computer system comprising:
   one or more processors; and
   one or more memories storing computer-readable instructions that, upon execution by the one or more processors, configure the computer system to:
      receive, from a first computing device of an entity, audio data corresponding to a natural language utterance of a user;
      determine, based at least in part on first processing of the audio data, (i) a request for an offer and (ii) a set of words unrelated to the request, the request corresponding to a first portion of the natural language utterance, the set of words corresponding to a second portion of the natural language utterance;
      determine a voice print based at least in part on second processing of at least a portion of the audio data;
      determine a set of candidate user accounts based at least in part on matching, for each candidate user account of the set of candidate user accounts, the set of words with a pre-stored set of words associated with the candidate user account;
      determine, from the set of candidate user accounts, a first user account of the user based at least in part on the voice print;
      determine, based at least in part on the audio data being received from the first computing device, an entity account of the entity;
      generate a first association of the first user account with an entity identifier of the entity and the offer; and
      generate a second association of the entity account with a user identifier of the user.

6. The computer system of claim 5, wherein the one or more memories store additional computer-readable instructions that, upon execution by the one or more processors, further configure the computer system to:
   associate, prior to determining the set of words and determining the voice print, the set of words and the voice print with the first user account;
   associate the offer with the entity account;
   send, to at least one of the first computing device or a second computing device associated with the entity account, second data indicating the user and the request for the offer; and
   send, to a third computing device associated with the first user account, third data indicating the entity and the request for the offer.

7. The computer system of claim 5, wherein the one or more memories store additional computer-readable instructions that, upon execution by the one or more processors, further configure the computer system to:
determine the set of words from the audio data based at least in part on a predefined location of the set of words in the natural language utterance.

8. The computer system of claim 5, wherein the one or more memories store additional computer-readable instructions that, upon execution by the one or more processors, further configure the computer system to:
generate words from the audio data;
determine that a subset set of the words relates to the request for the offer; and
determine the set of words as a second subset of the words that is unrelated to the request.

9. The computer system of claim 5, wherein the one or more memories store additional computer-readable instructions that, upon execution by the one or more processors, further configure the computer system to:
receive, from a second computing device associated with the first user account, first data corresponding to a first user input at the second computing device, the first data indicating the set of words or a selection of the set of words;
store, based at least in part on the first data, the set of words in association with the first user account;
receive, from the first computing device or a third computing device associated with the entity account, second data corresponding to a second user input, the second data indicating the offer; and
store, based at least in part on the second data, offer data in association with the entity account.

10. The computer system of claim 9, wherein the one or more memories store additional computer-readable instructions that, upon execution by the one or more processors, further configure the computer system to:
receive a confidence level associated with at least one of the set of words or the voice print,
wherein at least one of the set of candidate user accounts or the first user account is determined based at least in part on the confidence level.

11. The computer system of claim 10, wherein the one or more memories store further computer-readable instructions that, upon execution by the one or more processors, additionally configure the computer system to:
compare the confidence level to a confidence threshold; and
determine an authentication factor comprising at least one: a first location of the first computing device, a second location of a second computing device associated with the first user account, a history of offer requests associated with the first user account, a history of use of the set of words, the first user input at the first computing device indicating the request for the offer, or the second user input at the second computing device indicating the request, the history of use associated with the first user account,
wherein at least one of the set of candidate user accounts or the first user account is determined based at least in part on an outcome of the comparison and on the authentication factor.

12. The computer system of claim 11, wherein the entity account is of at least one of: a service provider of the computer system, a provider that provides offers based at least in part on the entity account, or another user.

13. One or more non-transitory computer-readable storage media storing instructions that, upon execution on a computer system, cause the computer system to perform operations that comprise:
receiving, from a first computing device of an entity, audio data corresponding to a natural language utterance of a user;
determining, based at least in part on first processing of the audio data, (i) a request for an offer and (ii) a set of words unrelated to the request, the request corresponding to a first portion of the natural language utterance, the set of words corresponding to a second portion of the natural language utterance;
determining a voice print based at least in part on second processing of at least a portion of the audio data;
determining a set of candidate user accounts based at least in part on matching, for each candidate user account of the set of candidate user accounts, the set of words with a pre-stored set of words associated with the candidate user account;
determining, from the set of candidate user accounts, a first user account of the user based at least in part on the voice print;
determining, based at least in part on the audio data being received from the first computing device, an entity account of the entity;
determining a match between the request and offer information associated with the entity account;
generating, based at least in part on the match, a first association of the first user account with the entity account and the offer; and
generating a second association of the entity account with the first user account.

14. The one or more non-transitory computer-readable storage media of claim 13, wherein the first user account is associated with a first location, wherein the entity account associates the first computing device with a second location, and wherein determining the set of candidate user accounts comprises:
setting a search region that includes the second location;
determining a different set of candidate user accounts associated with the search region and the set of words;
determining that no match exists between the voice print and the different set of candidate user accounts;
changing the search region to include the first location; and
determining the set of candidate user accounts based at least in part on associations between user accounts in the set of candidate user accounts with the search region and the set of words.

15. The one or more non-transitory computer-readable storage media of claim 13, and wherein the operations further comprise:
receiving, second data indicating a second natural language utterance;
determining at least one of: (i) a second set of words based at least in part on the second data, or (ii) a confidence level of the second set of words based at least in part on the second data;
determining at least one of: (iii) no match exists between the second set of words and user accounts, or (iv) the confidence level is smaller than a confidence threshold;
sending, to the first computing device, a request for the natural language utterance; and
receiving, from the first computing device and based at least in part on the request, the audio data.

16. The one or more non-transitory computer-readable storage media of claim 13, and wherein the operations further comprise:
- receiving second data indicating a second natural language utterance;
- determining at least one of: (i) a second voice print based at least in part on the second data, or (ii) a confidence level of the second voice print based at least in part on the second data;
- determining at least one of: (iii) no match exists between the second voice print and user accounts, or (iv) the confidence level is smaller than a confidence threshold;
- sending, to the first computing device, a request for the natural language utterance; and
- receiving, from the first computing device and based at least in part on the request, the audio data.

17. The one or more non-transitory computer-readable storage media of claim 13, wherein the operations further comprise:
- receiving, from a second computing device associated with the first user account, first data corresponding to a first user input at the second computing device, the first data indicating the set of words and a plurality of user accounts, the plurality of user accounts comprising the first user account and a second user account; and
- storing, based at least in part on the first data, the set of words in association with the first user account and the second user account.

18. The one or more non-transitory computer-readable storage media of claim 17, wherein the first user account and the second user account are further associated with the voice print, and wherein the operations further comprise:
- determining, from the set of user accounts, the second user account based at least in part on the voice print; and
- sending, to at least one of the first computing device or the second computing device, a request to select the first user account or the second user account.

19. The one or more non-transitory computer-readable storage media of claim 13, wherein the operations further comprise:
- sending, to a second computing device associated with the first user account, notification data indicating the entity and the offer, the notification data sent based at least in part on a notification setting associated with the first user account and with a use of the set of words.

20. The one or more non-transitory computer-readable storage media of claim 13, wherein the operations further comprise:
- sending, to at least one of the first computing device or a second computing device associated with the entity account, notification data indicating the user and the request for the offer, the notification data sent based at least in part on a notification setting associated with the entity account.

\* \* \* \* \*